United States Patent [19]

Iacona

[11] E Re. 28,987

[45] Reissued Oct. 5, 1976

[54] MOBILE HOME SKIRTING

[76] Inventor: Marco J. Iacona, 8301 - 16½ Mile Road, Apt. 101, Sterling Heights, Mich.

[22] Filed: May 18, 1972

[21] Appl. No.: 254,820

Related U.S. Patent Documents

Reissue of:

[64] Patent No.: 3,571,998
Issued: Mar. 23, 1971
Appl. No.: 774,845
Filed: Nov. 12, 1968

[52] U.S. Cl. ..... 52/478; 52/519; 52/588; 52/625; 52/DIG. 3

[51] Int. Cl.[2] ..... E04D 2/38

[58] Field of Search ..... 52/474, 478, 636, 537, 52/519, 241, 300, 588, 625, 627, 716, 64, DIG. 3, 530; 280/150

[56] References Cited

UNITED STATES PATENTS

| | | | |
|---|---|---|---|
| 2,180,504 | 11/1939 | Bradfield et al. | 52/588 |
| 2,745,523 | 5/1956 | Biggs | 52/300 X |
| 2,830,334 | 4/1958 | Schroyer | 52/530 |
| 3,042,425 | 7/1962 | Cathey et al. | 52/DIG. 3 |
| 3,085,367 | 4/1963 | DeRidder et al. | 52/588 X |
| 3,106,411 | 10/1963 | Holmes | 52/DIG. 3 |
| 3,218,091 | 11/1965 | Doak | 52/DIG. 3 |
| 3,234,697 | 2/1966 | Toti et al. | 52/588 X |
| 3,300,926 | 1/1967 | Heirich | 52/300 |
| 3,411,261 | 11/1968 | Soddy | 52/588 |
| 3,417,519 | 12/1968 | Hitter | 52/530 X |
| 3,452,501 | 7/1969 | Zimmer et al. | 52/625 |
| 3,562,983 | 2/1971 | Rector | 52/DIG. 3 |

*Primary Examiner*—Price C. Faw, Jr.
*Attorney, Agent, or Firm*—William L. Fisher

[57] ABSTRACT

Mobile home skirting is disclosed comprising a top track, a bottom track and a plurality of panels in said tracks, each track having a front wall and a back wall, [ each panel having a major portion forming a front wall thereof and a minor portion forming a back wall thereof, ] said panels arranged in edge overlapping and independently vertically slidable relationship to each other when disposed in said tracks with the front and back walls of the panels in contact, respectively, with the front and back walls of said tracks, the front wall of each panel and the front wall of [each] *at least one* track [both] being formed with mutually engageable locking means for retaining said panels in said tracks, the back wall of each panel and the back wall of each track [both] being formed for free engagement relative to each other, said panels being vertically slidable in said tracks when the bottom track moves vertically in respect to the top track on account of weather changes, each panel being vertically slidable independently of the other panels when said panels are disposed in said tracks for installation or disassembly of said panels in respect to said tracks, the front wall of each panel capable of being flexed in respect to the front wall of [each] *the respective* track so as to release said locking means to permit removal of said panel from the front side of said mobile home skirting.

5 Claims, 5 Drawing Figures

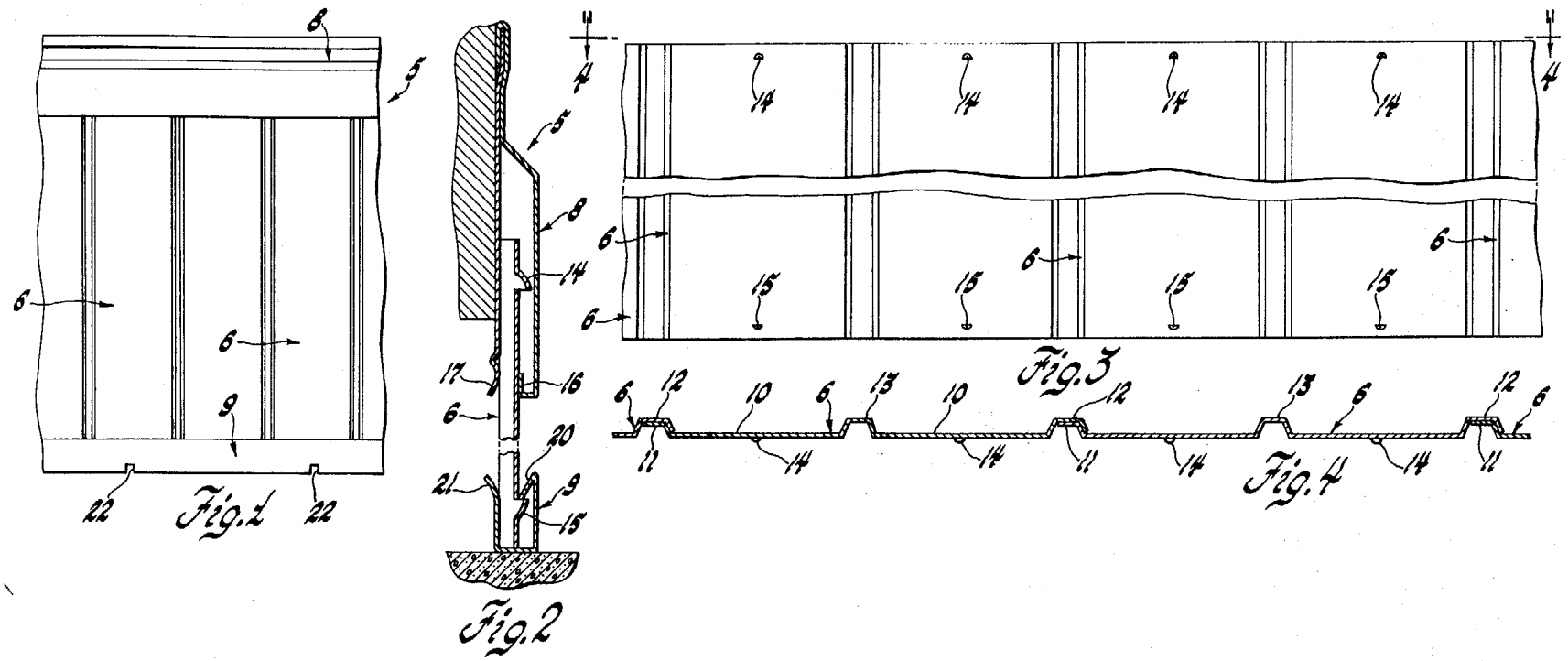
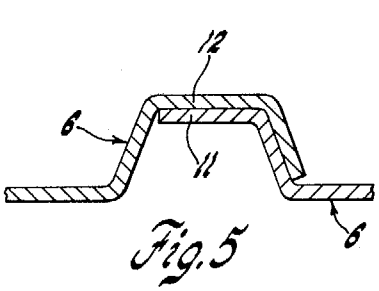
INVENTOR.
Marco J. Iacona
BY William L. Fisher Esq.
HIS ATTORNEY

MOBILE HOME SKIRTING

Matter enclosed in heavy brackets [ ] appears in the original patent but forms no part of this reissue specification; matter printed in italics indicates the additions made by reissue.

*This application is a reissue application of my original application Ser. No. 774,845, filed Nov. 12, 1968, now U.S. Pat. No. 3,571,998.*

My invention relates to mobile homes.

The principal object of my invention is the provision of improvements in mobile home skirting by which simplification is accomplished in application of mobil home skirting to mobile homes with consequent reduction in labor costs.

The foregoing object of my invention and its advantages will become apparent during the course of the following description taken in conjunction with the accompanying drawings in which FIG. 1 is a front elevational view of mobile home skirting embodying my invention;

FIG. 2 is a vertical sectional view of said embodiment;

FIGS. 3 and 4 are, respectively, front elevational and top plan views of parts of said embodiment; and FIG. 5 is an enlarged view of a portion of FIG. 4.

Referring to the drawings in greater detail, 5 generally designates said embodiment of mobile home skirting which comprises overlapped vertical panels 6 and top and bottom tracks 8 and 9, respectively. Each panel 6 has a flat main body portion 10 spaced apart from two inwardly pressed flat opposite end portions 11 and 12 parallel to said main body portion 10. The portion 10 which is a major portion of the panel 6 forms a front wall thereof and the portion 12 which is a minor portion of the panel 6 forms a back wall thereof. The end portion 11 is part of a male end on the panel 6 and the end portion 12 is part of a female end on the panel 6. The male end is formed of two bends having obtuse included angles and is received inside of a female end of an adjacent panel by edge overlapping, i.e. laying on edge of one panel upon on edge of another. The female end is formed of three bends having obtuse included angles into a pocket which receives the male end of an adjacent panel by overlapping and wraps around behind the same. The panels 6 when not retained in said tracks 8 and 9, are thus freely moveable face to face toward and away from each other. The portions 11 and 12 of overlapped panels are in face contacting contiguous relationship. Each panel 6 also includes a central rib formed of four bends having obtuse included angles and which includes an inwardly pressed flat portion 13 parallel to said main body portion and disposed in a common plane with the end portions 11 and 12. The back wall 12 of each panel and the back wall of each track are both formed for free engagement relative to each other, i.e. they have [not] *no* mutually engageable locking means therebetween. The front wall 10 of each panel 6 has top and bottom locking means 14 and 15, respctively, in the form of severed protuberances outwardly punched from the main body portion 10 which lock, respectively, with the front walls of the top and bottom tacks 8 and 9. The locking means 14 and 15 are arranged in top and bottom pairs on each panel 6 and operate downwardly and upwardly, respectively, against the front edges of their respective tracks. The top track 8 has spaced-apart front and back walls forming an elongated cavity in which the panels 6 can slide upwardly when the bottom track 9 rises from frost in the ground. The front and back walls of the top track 8 are joined together and abut each other at the upper end of the track and said front wall of the top track 8 is doubly bent below said upper end so as to be spring biased toward said back wall and against the front wall of any panel disposed in said top track 8. The front wall of the top track 8 has an inwardly and reversely bent free end 16 which coacts with the downwardly acting top panel locking means 14. The rear wall of the top track 8 has an outwardly flared end 17 which serves as a pilot for insertion of the panel 6 into the top track 8. The bottom track 9 has spaced apart front and back walls forming a cavity which receives the panels 6. The front wall of the bottom track 9 has an inwardly and reversely bent end 20 which coacts with the upwardly acting bottom panel locking means 15. The rear wall of the bottom track 9 has an outwardly flared end 21 which serves as a pilot for insertion of the panel 6 into the bottom track 9. The bottom track 9 is provided with drain openings 22 in the front wall thereof at the junction with the bottom wall thereof. Said embodiment 5 of mobile home skirting is applied by attaching the top track 8 to the mobile home and bottom track 9 to footing beneath the mobile home. The panels 6 are then installed each one first into the top track 8 and then into the bottom track 9 and one after the other in edge overlapping fashion because the panels 6 are installed by laying one over the other their installation proceeds rapidly without requiring any bending in the field. Once in place overlapped and in the tracks the panels 6 are locked securely against dislodgment but nevertheless can be removed easily for alterations or repairs because they are installed by laying one over the other and because the main body porton 10 of each panel 6 can be flexed by pushing inwardly upon the same to unlock first the locking means 15 from the end 20 and then the locking means 14 from the end 16. Said embodiment 5 is self-ventilating via the path upwardly behind the main body portions 10, into the top track 8, and downwardly in front of the flat supporting portions 11, 12 and 13.

It will thus be seen that there has been provided by my invention improvements in mobile home skirting in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims.

*It will thus be further seen that there has been disclosed a skirt assembly for parked house trailers comprising an upper panel section (front wall of said upper track 8) adapted for attachment to the trailer near floor level (see the bottom edge of the parked house trailer shown in section in FIG. 2) in depending relation thereto (FIG. 2 shows said front wall hanging down from the parked house trailer) and of a width less than the height of the trailer floor above ground level (the height or vertical width of said front wall can be seen from FIG. 2 to be less than the distance between the concrete and said bottom edge of the parked house trailer) and a plurality of relatively narrow panels 6 in telescoping relation to said upper panel section and in depending relation thereto; retaining means (back wall of said upper track 8) slidably retaining said narrow panels 6 in said telescoping relation*

*to said upper panel section adjacent the lower edge thereof and behind the panel section and interengaging means (end portions 11 and 12) connecting contiguous edges of adjacent narrow panels 6, said interengaging means permitting relative vertical movement between adjacent panels 6, whereby the vertical overall width of the assembly is variable along the length of the assembly.*

I claim:

1. Mobile home skirting comprising a top track, a bottom track and a plurality of panels in said tracks, each track having a front wall and a back wall, each panel having a major portion forming a front wall thereof and a minor portion forming a back wall thereof, said panels arranged in edge-overlapping and independently vertically slidable relationship to each other when disposed in said tracks with the front and back walls of the panels in contact, respectively, with the front and back walls of said tracks, the front wall of each panel and the front wall of each track both being formed with mutually engageable locking means for retaining said panels in said tracks, the back wall of each panel and the back wall of each track both being formed for free engagement relative to each other, said panels being vertically slidable in said tracks when the bottom track moves vertically in respect to the top track on account of weather changes, each panel being vertically slidable independently of the other panels when said panels are disposed in said tracks for installation or disassembly of said panels in respect to said tracks, the front wall of each panel capable of being flexed in respect to the front wall of each track so as to release each locking means to permit removal of said panel from the front side of said mobile home skirting.

2. Mobile home skirting comprising a track having a front wall and a back wall and at least one panel in said track, said panel having a major portion forming a front wall thereof and a minor portion forming a back wall thereof, said panel disposed in said track with the front and back walls thereof in contact, respectively, with the front and back walls of said track, the front wall of said panel and the front wall of said track both being formed with mutually engageable locking means for retaining said panel in said track, the back wall of said panel and the back wall of said track both being formed for free engagement relative to each other, said panel being vertically slidable in respect to said track for installation or disassembly of said panel in respect to said track, the front wall of said panel capable of being flexed in respect to the front wall of said track so as to release said locking means to permit removal of said panel from the front side of said mobile home skirting, the front and back walls of said track being joined together and abutting each other at one end of said track, said front wall being doubly bent at locations spaced from said one end of said track so as to be spring biased toward said back wall and against the front wall of said panel.

3. Mobile home skirting as claimed in claim 2, the back wall of each track formed so as to serve as a pilot means to facilitate insertion of said panels into said track.

*4. Mobile home skirting comprising a top track, a bottom track and a plurality of panels in said tracks, each track having a front wall and a back wall, each panel having a portion thereof forming a front wall and a portion thereof forming a back wall, said panels arranged in edge overlapping and independently vertically slidable relationship to each other when disposed in said tracks with the front and back walls thereof in contact, respectively, with the front and back walls of said tracks, the front wall of each panel and the front wall of at least one track being formed with mutually engageable locking means for retaining said panels in said tracks, the back wall of each panel and the back wall of each track being formed for free engagement relative to each other, said panels being vertically slidable in said tracks when the bottom track moves vertically in respect to the top track on account of weather changes, each panel being vertically slidable independently of the other panels when said panels are disposed in said tracks for installation or disassembly of said panels in respect to said tracks, the front wall of each panel capable of being flexed in respect to the front wall of the respective track so as to release said locking means to permit removal of said panel from the front side of said mobile home skirting.*

*5. Mobile home skirting comprising a track having a front wall and a back wall and at least one panel in said track, said panel having a portion thereof forming a front wall and a portion thereof forming a back wall, said panel disposed in said track with the front and back walls thereof in contact, respectively, with the front and back walls of said track, the back wall of said panel and the back wall of said track both being formed for free engagement relative to each other, said panel being vertically slidable in respect to said track for installation or disassenbly of said panel in respect to said track, the front and back walls of said track being joined together and abutting each other at one end of said track, said front wall being doubly bent at locations spaced from said one end of said track so as to be spring biased toward said back wall and against the front wall of said panel.*

* * * * *